United States Patent Office 2,756,135
Patented July 24, 1956

2,756,135

1-METHYL-3-(2-BENZOTHIAZOLYL)-UREAS AND THEIR USE AS HERBICIDES

Norman E. Searle, Wilmington, Del., assignor to E. I. du Pont de Nemours and Company, Wilmington, Del., a corporation of Delaware No Drawing. Application July 13, 1955,
Serial No. 521,900

3 Claims. (Cl. 71—2.5)

This invention relates to methods for the control of weeds and to compositions employed in practicing such methods.

The herbicidally active compounds of the invention are 1-methyl-3-(2-benzothiazolyl) ureas. More particularly, the compounds of the invention are represented by the following formula (1) 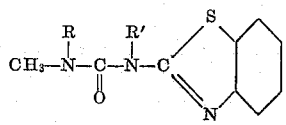

where R is hydrogen or a monovalent aliphatic hydrocarbon radical of less than 5 carbon atoms, and R' is hydrogen or methyl.

The compounds of this invention can be prepared by various methods leading to poly-substituted ureas, for example, by reaction of a 2-aminobenzothiazole with methyl isocyanate or with a suitably substituted carbamyl chloride as illustrated by the following equations:

(2) 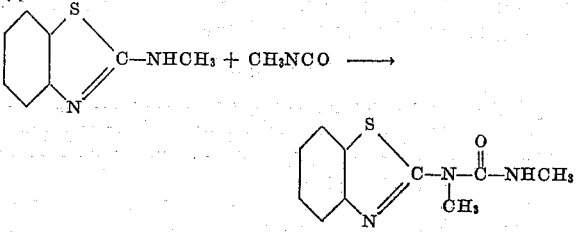

(3) 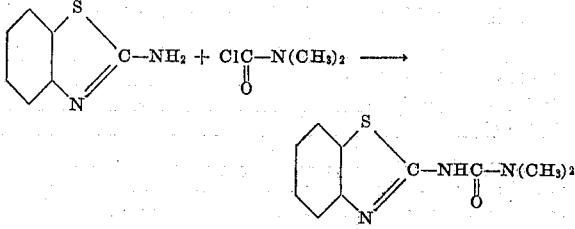

The above reactions are carried out by interacting the reactants in chemically equivalent amounts at reaction temperature. It is, in many cases, preferable to use an excess of the amine, for example, 2 to 5% molar excess.

Although not essential, the reactions illustrated above are advantageously carried out in an inert liquid media, for example, in xylene, toluene, dioxane or the like. In the method illustrated by Equation 3 above, it is advantageous to use an acid acceptor, for example, a tertiary amine such as triethylamine and pyridine. Ordinarily, temperatures from the range of 0°–175° C., and preferably 25°–140° C., are satisfactorily employed for the above reactions.

The 1-methyl-3-(2-benzothiazolyl) ureas of the invention have general herbicidal properties. They are especially useful in certain types of weed control such as, for example, in application to crop lands to give control of the common weeds without harming the crop plants; and for the control of crab grass in lawns.

Herbicidal compositions of the invention are prepared by admixing one or more of the 1-methyl-3-(2-benzothiazolyl) ureas, defined heretofore, in herbicidally effective amounts with a conditioning agent of the kind used and referred to in the art as a pest control adjuvant or modifier to provide formulations adapted for ready and efficient application to soil or weeds (i. e., unwanted plants) using conventional applicator equipment.

Thus the herbicidal compositions or formulations are prepared in the form of solids or liquids. Solid compositions are preferably in the form of dusts and are compounded to give homogeneous free-flowing dusts by admixing the active compound or compounds with finely divided solids preferably talcs, natural clays, pyrophyllite, diatomaceous earth, or flours such as walnut shell, wheat, redwood, soya bean, cottonseed flours and other inert solid conditioning agents or carriers of the kind conventionally employed in preparing pest control compositions in dust or powdered form.

Liquid compositions of the invention are prepared in the usual way by admixing one or more of the 1-methyl-3-(2-benzothiazolyl) ureas with a suitable liquid diluent medium. With certain solvents such as alkylated naphthalene, dimethyl formamide, and cresol, relatively high up to about 35% by weight or more concentration of the ureas can be obtained in solution. Other liquids conventionally used in preparing liquid herbicidal compositions are, for the most part, less effective solvents.

The herbicidal compositions of the invention whether in the form of dusts or liquids preferably also include a surface-active agent sometimes referred to in the art as a wetting, dispersing, or emulsifying agent. These agents, which will be referred to hereinafter more simply as surface-active dispersing agents, cause the compositions to be easily dispersed in water to give aqueous sprays which, for the most part, constitute a desirable composition for application.

The surface-active dispersing agents employed can be of the anionic, cationic, or nonionic type and include, for example, sodium and potassium oleate, the amine salts of oleic acid such as morpholine and dimethylamine oleates, the sulfonated animal and vegetable oils such as sulfonated fish and castor oils, sulfonated petroleum oils, sulfonated acyclic hydrocarbons, sodium salt of lignin sulfonic acid (goulac), alkylnaphthalene sodium sulfonate, sodium salts of sulfonated condensation products of naphthalene and formaldehyde, sodium lauryl sulfate, disodium monolauryl phosphate, sorbitol laurate, pentaerythritol monostearate, glycerol monostearate, diglycol oleate, polyethylene oxides, ethylene oxide condensation products with stearyl alcohol and octylphenol, polyvinyl alcohols, salts, such as the acetate of polyamines from reductive amination of ethylene/carbon monoxide polymers, laurylamine hydrochloride, laurylpyridinium bromide, stearyl-trimethylammonium bromide, cetyldimethylbenzyl ammonium chloride, lauryldimethylamine oxide, and the like. Generally, the surface-active agent will not comprise more than about 5 to 15% by weight of the composition, and in certain compositions the percentage will be 1% or less. Usually the minimum lower concentration will be 0.1%.

The herbicidal compositions are applied either as a spray or a dust to the locus or area to be protected from undesirable plant growth, commonly called weeds, i. e. plants growing where they are not wanted. Such application can be made directly upon the locus or area and the weeds thereon during the period of weed infestation in order to destroy the weeds, but preferably, the application is made in advance of an anticipated weed infestation to prevent such infestation. Thus, the compositions can be applied as aqueous foliar sprays but can also be applied as sprays directly to the surface of the soil. Alternatively, the dry powdered compositions can be dusted directly on the plants or on the soil.

In applying the herbicidal compositions of the invention for selective weed control as in the control of weeds in cotton or corn fields, the compositions are preferably applied after planting of the crop seeds but before emergence of the seedlings. In other words, the applications are of the pre-emergence type.

The active compound is, of course, applied in amount sufficient to exert the desired herbicidal action. The amount of the active compound present in the compositions as actually applied for destroying or preventing weeds will vary with the manner of application, the particular weeds for which control is sought, the purpose for which the application is being made, and like variables. In general, the herbicidal compositions as applied in the form of a spray or a dust will contain from about 0.5% to 85% by weight of the 1-methyl-3-(2-benzothiazolyl) ureas.

Fertilizer materials, other herbicidal agents, and other pest control agents such as insecticides and fungicides can be included in the herbicidal compositions of the invention if desired.

In order that the invention may be better understood the following examples are given in addition to the examples already given above. The examples illustrate a method for making compounds of the invention, herbicidal formulations employing such compounds, herbicidal applications, and the results obtained. Parts are by weight unless otherwise specified in the examples and the numbers following tabulated ingredients in the examples represent parts by weight of the ingredients in such compositions.

Example 1

A total of 108 parts by weight of dimethyl carbamyl chloride is mixed with 195 parts by weight of dry pyridine with stirring. This mixture is cooled to 5° C. and 150 parts by weight of 2-aminobenzothiazole is added with stirring. The reaction is exothermic and cooling is supplied to keep the reaction temperature between 55–65° C. The reacting mass is agitated at 55–60° C. for one hour and further agitated for three hours while permitting the reacting mass to cool.

A total of 1500 parts by weight of water is added to the reaction mass with agitation. The product precipitates, is filtered, and recrystallized from dilute acetic acid to yield 147 parts of 3-(2-benzothiazolyl)-1,1-dimethylurea, M. P. 218–220° C.

Analysis.—Calc'd for $C_{10}H_{11}N_3SO$: N, 19.00; S, 14.48. Found: N, 18.64; S. 14.55

The compound of this example is formulated to provide a free-flowing wettable powder adapted for dispersion in water for application as a herbicidal spray. The water dispersible powder composition is made by intimately mixing the ingredients listed below using conventional mixing or blending equipment, then grinding in a hammer mill to reduce the mixture to an average particle size of less than about 50 microns and then mixing again.

3-(2-benzothiazolyl)-1,1-dimethylurea ---------- 80
Alkyl naphthalene sulfonic acid ---------------- 1.75
Methyl cellulose, 15 cps. ----------------------- 0.50
Attapulgite ------------------------------------- 17.75

Applied in aqueous dispersion at a rate of 18 pounds of the 1-methyl-3-(2-benzothaziole) urea compound per acre, the above formulation gives good kill of both shallow rooted perennial grasses such as quack grass and deep rooted perennial grasses such as Johnson grass.

Example 2

By substituting a molar equivalent of N-methyl-N-butyl-carbamyl chloride for dimethylcarbamyl chloride in Example 1 above, white crystalline 3-(2-benzothiazolyl)-1-butyl-1-methylurea is obtained, M. P. 124.5–125.5° C.

Analysis.—Calc'd for $C_{13}H_{17}N_3SO$: N, 15.95; S, 12.16. Found: N, 15.75; S, 12.01.

The compound prepared as above is formulated to provide a composition in the form of an aqueous suspension of the compound by placing the ingredients shown below in a pebble mill and milling for 24 hours:

3-(2-benzothiazolyl)-1-butyl-1-methylurea ---------- 30
Goulac (tech. sodium lignin sulfonate) ------------ 5
Hydrated attapulgite ------------------------------ 3
Water --------------------------------------------- 62

The aqueous suspension prepared as above is diluted with water to give a spray composition containing 0.5% by weight of the 1-methyl-3-(2-benzothiazolyl) urea compound and is sprayed on undesirable vegetation including brambles, sheep sorrell, lambs quarter, and Bermuda grass. The contact kill exceeds that of 2,4-dinitro-o-sec. butyl phenol applied at the same concentration.

Example 3

3-(2-benzothiazolyl)-3,1,1-trimethylurea is prepared by substituting a molar equivalent of N-methyl-2-amino-benzothiazole for 2-aminobenzothiazole in Example 1 above.

The compound of this example is formulated to provide an oil composition emulsifiable in water to yield a milky emulsion by mixing the components tabulated below and agitating until complete solution results.

3-(2-benzothiazolyl)-3,1,1-trimethyl urea ---------- 25
Alkylated naphthalene (principally α-methyl-naphthalene) -------------------------------------------- 70
Alkyl aryl polyether alcohol ---------------------- 5

The above formulation emulsified in water and applied at a rate of 20 pounds of the 1-methyl-3-(2-benzothiazolyl) urea compound per acre gives excellent kill of most vegetation including scrub oak, trumpet vine, brambles, Bermuda grass, quack grass and crab grass.

Example 4

3-(2-benzothiazolyl)-1-methyl-1-isopropylurea is prepared by substituting one molar equivalent of N-methyl-N-isopropyl carbamyl chloride for dimethylcarbamyl chloride in Example 1 above.

The compound prepared as above is formulated to provide a composition in the form of an aqueous suspension of the compound by placing the ingredients shown below in a pebble mill and milling for 24 hours.

3-(2-benzothiazolyl)-1-methyl-1-isopropylurea ------ 30
Goulac (tech. sodium lignin sulfonate) ------------ 5
Hydrated attapulgite ------------------------------ 3
Water --------------------------------------------- 62

Applied to foligate as an aqueous suspension containing 0.5% by weight of the active urea compound, the above formulation gives good contact kill in a manner similar to that of the formulation of Example 2.

Example 5

3-(2-benzothiazolyl)-1-allyl-1-methylurea is prepared by substituting a molar equivalent of N-allyl-N-methyl-carbamyl chloride for dimethylcarbamyl chloride in Example 1 above.

The compound of this example is formulated to provide a free-flowing wettable powder adapted for dispersion in water for application as a herbicidal spray. The water dispersible powder composition is made by intimately mixing the ingredients listed below using conventional mixing or blending equipment, then grinding in a hammer mill to reduce the mixture to an average particle size of less than about 50 microns and then mixing again.

3-(2-benzothiazolyl)-1-allyl-1-methylurea _____ 80
Alkyl naphthalene sulfonic acid_____ 1.75
Methyl cellulose, 15 cps_____ 0.50
Attapulgite _____ 17.75

Applied to foliage as an aqueous suspension containing by weight of the active urea compound, the above formulation gives excellent contact kill of undesirable foliage such as sheep sorrell and Bermuda grass.

Example 6

1-(2-benzothiazolyl)-1,3-dimethyl-3-propylurea is obtained by substituting one molar equivalent of N-methyl-2-aminobenzothiazole for 2-aminobenzothiazole and one molar equivalent of N-methyl-N-propylcarbamyl chloride for dimethylcarbamyl chloride in Example 1 above.

A free-flowing dust free granular composition suitable for application with a fertilizer spreader or lawn seeder is prepared having the following composition.

1-(2-benzothiazolyl)-1,3-dimethyl-3-propylurea ___ 10
Attapulgite _____ 2
Diesel oil_____ 9.8
Alkyl aryl polyether alcohol (emulsifier)_____ 0.2
Water _____ 15.0
Granular vermiculite_____ 63.0

In making the above formulation, the urea compound and attapulgite are first mixed and hammer milled and the mixture is then pasted into the mixture of the oil and emulsifier. The water is then stirred into the resulting paste and the whole is sprayed upon the vermiculite while agitating it in a ribbon blender.

The granular formulation of this example applied by means of a fertilizer spreader at a rate of 8 pounds of the active compound per acre gives good control of chickweed without injury to desirable turf grasses.

Example 7

1-(2-benzothiazolyl)-1,3-dimethyl-3-sec.butyl urea is prepared by substituting one molar equivalent of N-methyl-2-aminobenzothiazole for 2-aminobenzothiazole and N-methyl-sec.butylcarbamyl chloride for dimethylcarbamyl chloride in Example 1 above.

The compound of this example is formulated to provide an oil composition emulsifiable in water to yield a milky emulsion by mixing the components tabulated below and agitating until complete solution results.

1-(2-benzothiazolyl)-1,3-dimethyl-3-sec.butylurea __ 25
Alkylated naphthalene (principally α-methyl-naphthalene _____ 70
Alkyl aryl polyether alcohol_____ 5

Emulsified in water and applied at a rate of 20 pounds of the active urea compound per acre, the above formulation gives excellent eradicant action against such plants as Johnson grass, Bermuda grass, vasey grass and lambs quarter, exhibiting not only contact kill as a result of the application of the formulation to the foliage of the plants but also kill resulting from absorption of the active compound thru the root system of plants.

Example 8

1-(2-benzothiazolyl)-1,3-dimethyl-3-ethylurea is prepared by substituting one molar equivalent of N-methyl-2-aminobenzothiazole for 2-aminobenzothiazole and N-methyl-ethylcarbamyl chloride for dimethylcarbamyl chloride in Example 1 above.

A dust composition suitable for broadcast application with conventional dusting equipment is made by blending and hammer milling 1-(2-benzothiazolyl)-1,3-dimethyl-3-ethylurea with attapulgite and then blending the resulting mix with pyrophyllite in a ribbon blender to give the following composition.

1-(2-benzothiazolyl)-1,3-dimethyl-3-ethylurea ____ 10
Attapulgite _____ 2.5
Pyrophyllite _____ 87.5

The dust formulation of this example is broadcast at a rate of 8 pounds of the active urea compound per acre to give effective control of germinating seeds of annual plants such as crabgrass, foxtail, mustard and chickweed without destroying perennial grasses.

Example 9

57 parts of methylisocyanate dissolved in 1000 parts of benzene is mixed with 150 parts of 2-aminobenzothiazole. The reacting mass is agitated and heated at reflux temperature for two hours. The reaction mass is then filtered while hot to obtain 155 parts of white 3-(2-benzothiazolyl)-1-methylurea, M. P. 265° C. with decomposition.

*Analysis.*—Calc'd. for $C_9H_9N_3OS$: N, 20.29; S, 15.45. Found: N, 19.88; S, 15.06.

The compound of this example is formulated to provide a free-flowing wettable powder adapted for dispersion in water for application as a herbicidal spray. The water dispersible powder composition is made by intimately mixing the ingredients listed below using conventional mixing or blending equipment, then grinding in a hammer mill to reduce the mixture to an average particle size of less than about 50 microns and then mixing again.

3-(2-benzothiazolyl)-1-methylurea _____ 80
Alkyl naphthalene sulfonic acid_____ 1.75
Methyl cellulose, 15 cps_____ 0.50
Attapulgite _____ 17.75

The formulation of this example is dispersed in water and applied to lawn grass at a rate of 4 pounds of the active urea compound per acre just prior to the emergence of crabgrass seedlings. Excellent control of crabgrass is obtained with no grass injury to perennial turf grasses.

Example 10

150 parts of N-methyl-2-aminobenzothiazole is added to a solution of 57 parts of methylisocyanate in 1000 parts of benzene. The resulting mix is agitated and heated at reflux temperature for two hours. Upon cooling, 1-(2-benzothiazolyl)-1,3-dimethylurea crystallizes out of solution. There is obtained 140 parts of this product, M. P. 119–20.5° C.

*Analysis.*—Calc'd for $C_{10}H_{11}N_3OS$: S, 14.45. Found: S, 14.33.

The compound prepared as above is formulated to provide a composition in the form of an aqueous suspension of the compound by placing the ingredients shown below in a pebble mill and milling for 24 hours.

1-(2-benzothiazolyl)-1,3-dimethylurea _____ 30
Golac (tech. sodium lignin sulfonate) _____ 5
Hydrated attapulgite _____ 3
Water _____ 62

The formulation prepared as above is diluted with water and applied as a pre-emergence application at a rate of 6 pounds of the active urea compound per acre to an area planted with cotton. There is obtained 100% control of broadleaf weeds and 94.7% control of all weeds. The cotton plants are not injured.

Example 11

3-(2-benzothiazolyl)-1,1-dimethylurea is prepared by the following reaction:

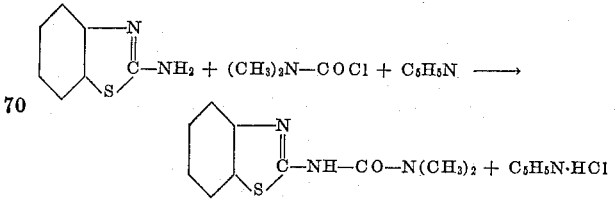

To a mixture of 35 parts of (0.325 mole) of dimethylcarbamyl chloride with 27.7 parts (0.35 mole) of pyridine at 0° C. is added 37.6 parts (0.25 mole) of 2-aminobenzothiazole. Upon warming the mixture to 34° C. an exothermic reaction occurs which increases the temperature to a maximum of 72° C. during a 10-minute period. The viscous reaction mixture is stirred for 1.8 hours and, after standing overnight at room temperature, poured into 200 parts of water. The crystals which precipitated are filtered, washed with water and dried. Recrystallization of the crude product (43 parts, 79% yield) from 700 parts of ethyl alcohol gives 18.5 parts of white crystals of 3-(2-benzothiazolyl)-1,1-dimethylurea. This product is soluble in dilute aqueous sodium hydroxide and hydrochloric acid.

*Analysis.*—Calc'd for $C_{10}H_{11}N_3OS$: N, 18.99; S, 14.45. Found: N, 18.74; S, 14.47.

It will be apparent to those skilled in the art that other compounds of the invention can be similarly prepared and formulated and applied by the methods described heretofore for weed control. Illustrative of such other compounds are:

3-(2-benzothiazolyl)-1-ethyl-1-methylurea
3-(2-benzothiazolyl)-1-methyl-1-propylurea
3-(2-benzothiazolyl)-1-sec. butyl-1-methylurea
3-(2-benzothiazolyl)-1-isobutyl-1-methylurea
1-allyl-3-(2-benzothiazolyl)-1,3-dimethylurea
3-(2-benzothiazolyl)-1-*n*-butyl-1,3-dimethylurea
3-(2-benzothiazolyl)-1-isobutyl-1,3-dimethylurea
3-(2-benzothiazolyl)-1-butenyl-1,3-dimethylurea This application is a continuation-in-part of copending applications Serial Nos. 303,406 and 303,407 filed August 8, 1952, both now abandoned.

While the invention has been described with particular reference to specific embodiments, it will be appreciated that no unnecessary limitations are to be understood therefrom. The invention is not limited to the exact details shown and described for obvious modifications will occur to those skilled in the art.

I claim:
1. A method for the control of weeds which comprises applying to a locus to be protected a 1-methyl-3-(2-benzothiazolyl) urea represented by the formula

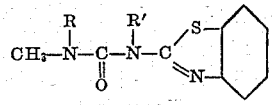

where R is selected from the group consisting of hydrogen and a monovalent aliphatic hydrocarbon radical of less than 5 carbon atoms, and R' is selected from the group consisting of hydrogen and methyl.

2. A herbicidal composition comprising a conditioning agent and a 1-methyl-3-(2-benzothiazolyl) urea represented by the formula

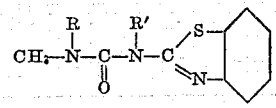

where R is selected from the group consisting of hydrogen and a monovalent aliphatic hydrocarbon radical of less than 5 carbon atoms, and R' is selected from the group consisting of hydrogen and methyl.

3. A 1-methyl-3-(2-benzothiazolyl) urea represented by the formula

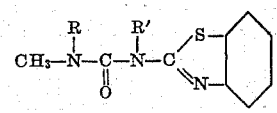

where R is selected from the group consisting of hydrogen and a monovalent aliphatic hydrocarbon radical of less than 5 carbon atoms, and R' is selected from the group consisting of hydrogen and methyl.

No references cited.